United States Patent
Newton et al.

(10) Patent No.: US 10,582,434 B2
(45) Date of Patent: Mar. 3, 2020

(54) DEVICE AND METHOD FOR DERIVING ALIGNMENT INFORMATION

(75) Inventors: Timothy Newton, Cambridge (GB); Robert Young, Cambridge (GB)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 14/126,069

(22) PCT Filed: May 23, 2012

(86) PCT No.: PCT/EP2012/059566
§ 371 (c)(1),
(2), (4) Date: Apr. 22, 2014

(87) PCT Pub. No.: WO2012/171763
PCT Pub. Date: Dec. 20, 2012

(65) Prior Publication Data
US 2014/0269669 A1    Sep. 18, 2014

(30) Foreign Application Priority Data

Jun. 13, 2011 (GB) .................................. 1109829.0
Jun. 13, 2011 (GB) .................................. 1109830.8
(Continued)

(51) Int. Cl.
*H04W 72/04* (2009.01)
*H04W 36/22* (2009.01)
(Continued)

(52) U.S. Cl.
CPC ............ *H04W 36/22* (2013.01); *H04B 1/713* (2013.01); *H04L 5/0032* (2013.01); *H04L 7/041* (2013.01);
(Continued)

(58) Field of Classification Search
CPC ... H04J 3/06; H04L 7/00; H04L 12/26; H04B 15/00; H04W 56/00
(Continued)

(56) References Cited

U.S. PATENT DOCUMENTS 5,101,508 A    3/1992 Owaki
5,189,411 A    2/1993 Collar et al.
(Continued)

FOREIGN PATENT DOCUMENTS

CN    101374133 A    2/2009
EP    1093318 A2    4/2001
(Continued)

OTHER PUBLICATIONS

Kirkidis et al., "Protocol design and Throughput Analysis for Multi-User Cognitive Cooperative Systems", IEEE Transaction on Wireless Communications, vol. 8, No. 9, Sep. 2009.*
(Continued)

*Primary Examiner* — Sulaiman Nooristany
(74) *Attorney, Agent, or Firm* — Slater Matsil, LLP

(57) ABSTRACT

A communication device configured to operate in accordance with a first communication protocol and to align itself with one or more communications transmitted in accordance with that protocol by identifying a communication transmitted in accordance with a second communication protocol that is not intended for the communication device, deriving alignment information from the identified communication and configuring itself to receive a communication transmitted in accordance with the first communication protocol in dependence on the alignment information.

19 Claims, 5 Drawing Sheets

(30) Foreign Application Priority Data

Figure 1:
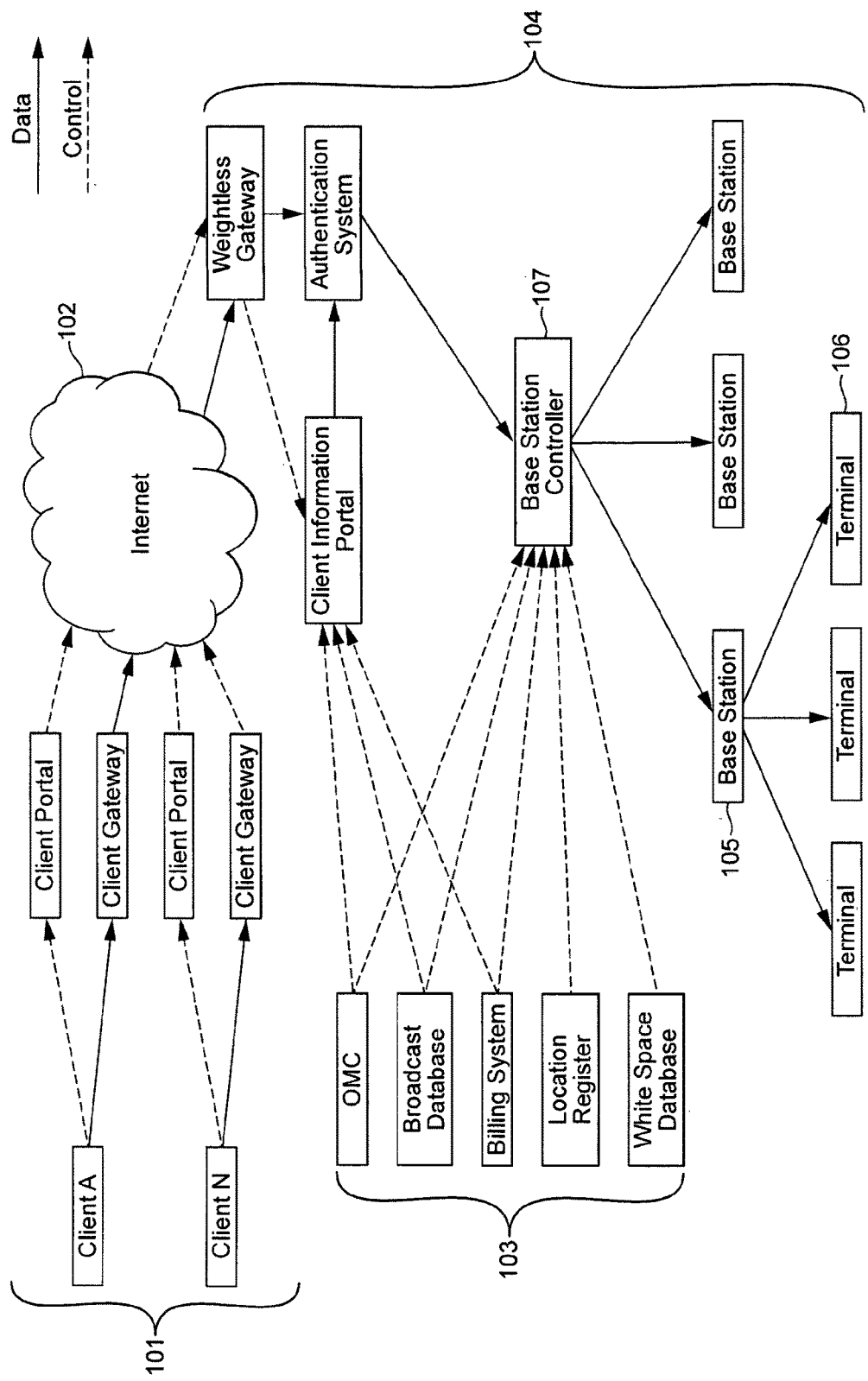

| Jun. 13, 2011 | (GB) | ................................ | 1109836.5 |
| Jun. 13, 2011 | (GB) | ................................ | 1109837.3 |
| Jun. 13, 2011 | (GB) | ................................ | 1109840.7 |
| Jun. 13, 2011 | (GB) | ................................ | 1109844.9 |
| Jun. 13, 2011 | (GB) | ................................ | 1109848.0 |
| Jun. 13, 2011 | (GB) | ................................ | 1109850.6 |
| Jun. 13, 2011 | (GB) | ................................ | 1109853.0 |
| Jun. 13, 2011 | (GB) | ................................ | 1109854.8 |
| Jun. 13, 2011 | (GB) | ................................ | 1109863.9 |
| Jun. 13, 2011 | (GB) | ................................ | 1109867.0 |
| Jun. 13, 2011 | (GB) | ................................ | 1109874.6 |
| Sep. 30, 2011 | (GB) | ................................ | 1116910.9 |
| Dec. 23, 2011 | (GB) | ................................ | 1122247.8 |

(51) Int. Cl.

| H04L 12/801 | (2013.01) |
| H04W 4/70 | (2018.01) |
| H04L 7/04 | (2006.01) |
| H04W 64/00 | (2009.01) |
| H04W 72/12 | (2009.01) |
| H04L 29/08 | (2006.01) |
| H04L 29/06 | (2006.01) |
| H04L 25/06 | (2006.01) |
| H04B 1/713 | (2011.01) |
| H04L 5/00 | (2006.01) |
| H04W 8/18 | (2009.01) |
| H04W 56/00 | (2009.01) |
| H04W 36/00 | (2009.01) |
| H04W 28/06 | (2009.01) |
| H04W 24/02 | (2009.01) |
| H04B 7/26 | (2006.01) |
| H04W 16/14 | (2009.01) |
| H04W 88/10 | (2009.01) |
| H04W 12/06 | (2009.01) |

(52) U.S. Cl.
 CPC ............ *H04L 25/061* (2013.01); *H04L 47/10* (2013.01); *H04L 67/28* (2013.01); *H04L 69/18* (2013.01); *H04W 4/70* (2018.02); *H04W 8/18* (2013.01); *H04W 24/02* (2013.01); *H04W 28/065* (2013.01); *H04W 36/0066* (2013.01); *H04W 56/001* (2013.01); *H04W 56/0015* (2013.01); *H04W 64/00* (2013.01); *H04W 72/048* (2013.01); *H04W 72/1215* (2013.01); *H04W 72/1242* (2013.01); *H04B 7/2656* (2013.01); *H04W 12/06* (2013.01); *H04W 16/14* (2013.01); *H04W 88/10* (2013.01); *Y04S 40/24* (2013.01)

(58) Field of Classification Search
 USPC ............... 370/350, 503–520; 709/230, 248; 455/443, 450
 See application file for complete search history.

(56) References Cited

U.S. PATENT DOCUMENTS

| 5,404,355 | A | 4/1995 | Raith |
| 5,515,375 | A | 5/1996 | DeClerck |
| 5,613,205 | A | 3/1997 | Dufour |
| 5,748,104 | A | 5/1998 | Argyroudis et al. |
| 5,748,147 | A | 5/1998 | Bickley et al. |
| 5,748,676 | A | 5/1998 | Mahany |
| 5,757,858 | A | 5/1998 | Black et al. |
| 5,818,872 | A | 10/1998 | Gupta |
| 5,872,814 | A | 2/1999 | McMeekin |
| 5,883,886 | A | 3/1999 | Eaton et al. |
| 5,914,672 | A | 6/1999 | Glorioso et al. |
| 5,969,673 | A | 10/1999 | Bickley et al. |
| 5,977,881 | A | 11/1999 | Kido |
| 6,005,884 | A | 12/1999 | Cook et al. |
| 6,073,169 | A | 6/2000 | Shuey et al. |
| 6,340,928 | B1 | 1/2002 | McCurdy |
| 6,411,608 | B2 | 6/2002 | Sharony |
| 6,490,452 | B1 | 12/2002 | Boscovic et al. |
| 6,580,358 | B1* | 6/2003 | Nysen .................... G01S 13/755 340/10.1 |
| 6,621,454 | B1 | 9/2003 | Reudink et al. |
| 6,785,511 | B1 | 8/2004 | Hengeveld et al. |
| 6,889,040 | B1* | 5/2005 | Koo ....................... H04W 28/18 370/466 |
| 7,151,966 | B1 | 12/2006 | Baier et al. |
| 7,302,266 | B1 | 11/2007 | Sill et al. |
| 7,342,897 | B1 | 3/2008 | Nader et al. |
| 7,512,094 | B1 | 3/2009 | Linbarger et al. |
| 7,697,492 | B2 | 4/2010 | Petite |
| 7,844,286 | B1 | 11/2010 | Sennett et al. |
| 7,873,018 | B2 | 1/2011 | Kakani |
| 7,948,991 | B1 | 5/2011 | Hart et al. |
| 7,974,637 | B1 | 7/2011 | Taveniku |
| 8,126,473 | B1 | 2/2012 | Kim et al. |
| 8,233,091 | B1* | 7/2012 | Rabinowitz ............. H04N 5/06 348/554 |
| 8,381,301 | B1* | 2/2013 | Wilson .................. H04L 43/026 370/252 |
| 8,396,086 | B1 | 3/2013 | Gossett et al. |
| 8,599,767 | B2* | 12/2013 | Walton .................. H04W 48/16 370/329 |
| 8,615,253 | B2 | 12/2013 | MacGougan et al. |
| 8,806,044 | B2* | 8/2014 | Ling ....................... H04L 69/28 370/503 |
| 8,855,708 | B2 | 10/2014 | Bhat et al. |
| 8,897,394 | B1 | 11/2014 | Nabar et al. |
| 2001/0048691 | A1 | 12/2001 | Chang et al. |
| 2001/0055356 | A1 | 12/2001 | Davies |
| 2002/0061031 | A1* | 5/2002 | Sugar .................... H04W 16/14 370/466 |
| 2002/0080816 | A1 | 6/2002 | Spinar et al. |
| 2002/0094799 | A1 | 7/2002 | Elliott et al. |
| 2002/0109607 | A1 | 8/2002 | Cumeralto et al. |
| 2002/0122403 | A1 | 9/2002 | Hashem et al. |
| 2002/0136183 | A1* | 9/2002 | Chen ................. H04W 72/1215 370/338 |
| 2003/0034900 | A1 | 2/2003 | Han |
| 2003/0048199 | A1 | 3/2003 | Zigdon et al. |
| 2003/0063619 | A1 | 4/2003 | Montano et al. |
| 2003/0123384 | A1 | 7/2003 | Agee |
| 2003/0156564 | A1 | 8/2003 | Frerking et al. |
| 2003/0186653 | A1 | 10/2003 | Mohebbi et al. |
| 2003/0198304 | A1* | 10/2003 | Sugar et al. .................. 375/340 |
| 2004/0097249 | A1 | 5/2004 | Manohar |
| 2004/0176094 | A1 | 9/2004 | Kim et al. |
| 2004/0190663 | A1 | 9/2004 | Carsello et al. |
| 2004/0203815 | A1 | 10/2004 | Shoemake et al. |
| 2004/0232277 | A1 | 11/2004 | Gehlot et al. |
| 2004/0264432 | A1 | 12/2004 | Hori et al. |
| 2005/0013325 | A1 | 1/2005 | Choi et al. |
| 2005/0068886 | A1 | 3/2005 | Wang et al. |
| 2005/0096051 | A1 | 5/2005 | Lee et al. |
| 2005/0096089 | A1 | 5/2005 | Ishii et al. |
| 2005/0110656 | A1 | 5/2005 | Patterson et al. |
| 2005/0111452 | A1 | 5/2005 | Mamillapalli et al. |
| 2005/0181823 | A1* | 8/2005 | Haartsen ................ H04W 16/14 455/553.1 |
| 2005/0250497 | A1 | 11/2005 | Ghosh et al. |
| 2006/0009191 | A1 | 1/2006 | Malone, III |
| 2006/0013325 | A1 | 1/2006 | Agrawal et al. |
| 2006/0023691 | A1 | 2/2006 | Franchuk et al. |
| 2006/0140117 | A1 | 6/2006 | Aerrabotu et al. |
| 2006/0154703 | A1 | 7/2006 | Kim |
| 2006/0167784 | A1 | 7/2006 | Hoffberg |
| 2006/0173995 | A1 | 8/2006 | Moriwaki |
| 2006/0183453 | A1 | 8/2006 | Muhammad et al. |
| 2006/0184854 | A1 | 8/2006 | Ihm et al. |
| 2006/0193373 | A1 | 8/2006 | Agee et al. |

(56) References Cited

U.S. PATENT DOCUMENTS

| | | |
|---|---|---|
| 2006/0203707 A1 | 9/2006 | Lee et al. |
| 2006/0209891 A1 | 9/2006 | Yamada et al. |
| 2006/0223557 A1* | 10/2006 | Manohar .......... H04W 36/0088 455/502 |
| 2006/0284784 A1 | 12/2006 | Smith et al. |
| 2006/0285504 A1 | 12/2006 | Dong et al. |
| 2007/0026868 A1 | 2/2007 | Schulz et al. |
| 2007/0053351 A1 | 3/2007 | Kalogridis |
| 2007/0149242 A1 | 6/2007 | Kim et al. |
| 2007/0174885 A1 | 7/2007 | Hus et al. |
| 2007/0183352 A1 | 8/2007 | Muhammad et al. |
| 2007/0195899 A1 | 8/2007 | Bhushan et al. |
| 2007/0248076 A1 | 10/2007 | Ji et al. |
| 2007/0249341 A1 | 10/2007 | Chu et al. |
| 2007/0268884 A1 | 11/2007 | Kolavennu et al. |
| 2007/0280184 A1 | 12/2007 | Shin et al. |
| 2008/0031179 A1 | 2/2008 | Gao et al. |
| 2008/0056218 A1 | 3/2008 | Binzel et al. |
| 2008/0076426 A1 | 3/2008 | Nam |
| 2008/0096518 A1 | 4/2008 | Mock et al. |
| 2008/0107095 A1 | 5/2008 | Black et al. |
| 2008/0108365 A1 | 5/2008 | Buddhikot |
| 2008/0129497 A1 | 6/2008 | Woodard et al. |
| 2008/0159239 A1 | 7/2008 | Odlyzko et al. |
| 2008/0167047 A1 | 7/2008 | Abedi |
| 2008/0188225 A1 | 8/2008 | Park et al. |
| 2008/0214192 A1 | 9/2008 | Soliman |
| 2008/0219239 A1 | 9/2008 | Bell et al. |
| 2008/0242301 A1 | 10/2008 | Osterling et al. |
| 2008/0250294 A1 | 10/2008 | Ngo et al. |
| 2008/0259857 A1 | 10/2008 | Zheng |
| 2008/0273582 A1 | 11/2008 | Gaal et al. |
| 2009/0024848 A1 | 1/2009 | Takasugi et al. |
| 2009/0040057 A1 | 2/2009 | Keyghobad et al. |
| 2009/0041166 A1 | 2/2009 | Patel et al. |
| 2009/0052363 A1 | 2/2009 | Matsue et al. |
| 2009/0067358 A1 | 3/2009 | Fischer |
| 2009/0086713 A1 | 4/2009 | Luo |
| 2009/0109056 A1 | 4/2009 | Tamarkin et al. |
| 2009/0115896 A1* | 5/2009 | Thaly ................ H04N 21/439 348/484 |
| 2009/0116430 A1* | 5/2009 | Bonta ................ H04W 84/18 370/329 |
| 2009/0129367 A1 | 5/2009 | Bitran |
| 2009/0179771 A1 | 7/2009 | Seal et al. |
| 2009/0180402 A1 | 7/2009 | Lindoff et al. |
| 2009/0209265 A1 | 8/2009 | Kwon et al. |
| 2009/0215464 A1 | 8/2009 | Tanno et al. |
| 2009/0232120 A1* | 9/2009 | Matthes ............... H04W 16/14 370/342 |
| 2009/0247111 A1 | 10/2009 | Sennett et al. |
| 2009/0247189 A1 | 10/2009 | Sennett et al. |
| 2009/0257396 A1 | 10/2009 | Eliezer et al. |
| 2009/0268728 A1* | 10/2009 | Santos ................ H04L 41/022 370/389 |
| 2009/0279464 A1 | 11/2009 | Kakani et al. |
| 2009/0279470 A1 | 11/2009 | Seok |
| 2009/0279591 A1 | 11/2009 | Filipovic et al. |
| 2009/0310589 A1 | 12/2009 | Nangia et al. |
| 2009/0310653 A1 | 12/2009 | Gorday |
| 2009/0325481 A1 | 12/2009 | Mohebbi |
| 2010/0002630 A1 | 1/2010 | Park et al. |
| 2010/0015956 A1 | 1/2010 | Qu et al. |
| 2010/0022245 A1 | 1/2010 | Sato |
| 2010/0058261 A1* | 3/2010 | Markov .............. G06F 17/5045 716/106 |
| 2010/0069069 A1 | 3/2010 | Lee et al. |
| 2010/0099432 A1 | 4/2010 | Glover et al. |
| 2010/0120431 A1 | 5/2010 | Hwang et al. |
| 2010/0124194 A1 | 5/2010 | Chun et al. |
| 2010/0124898 A1 | 5/2010 | Qu et al. |
| 2010/0135272 A1 | 6/2010 | Dayal et al. |
| 2010/0135447 A1 | 6/2010 | Sapozhnykov et al. |
| 2010/0142458 A1 | 6/2010 | Mark |
| 2010/0157825 A1 | 6/2010 | Anderlind et al. |
| 2010/0172310 A1 | 7/2010 | Cheng et al. |
| 2010/0177697 A1 | 7/2010 | Tanno et al. |
| 2010/0202349 A1 | 8/2010 | Guan |
| 2010/0246506 A1* | 9/2010 | Krishnaswamy ... H04W 72/085 370/329 |
| 2010/0254392 A1 | 10/2010 | Katar et al. |
| 2010/0255853 A1 | 10/2010 | Kountouris |
| 2010/0273488 A1 | 10/2010 | Kim |
| 2010/0304678 A1 | 12/2010 | Chandra et al. |
| 2010/0309806 A1 | 12/2010 | Wu et al. |
| 2011/0007720 A1 | 1/2011 | Shimizu et al. |
| 2011/0013708 A1 | 1/2011 | Hedayat et al. |
| 2011/0026649 A1 | 2/2011 | Lipka et al. |
| 2011/0039578 A1 | 2/2011 | Rowitch et al. |
| 2011/0064021 A1 | 3/2011 | Patini |
| 2011/0069653 A1 | 3/2011 | Wang et al. |
| 2011/0090939 A1 | 4/2011 | Diener et al. |
| 2011/0095903 A1 | 4/2011 | Gudlavenkatasiva et al. |
| 2011/0110291 A1 | 5/2011 | Ishii |
| 2011/0134850 A1 | 6/2011 | Kishigami et al. |
| 2011/0170499 A1 | 7/2011 | Nayeb Nazar et al. |
| 2011/0194432 A1 | 8/2011 | Kato et al. |
| 2011/0213871 A1 | 9/2011 | DiGirolamo et al. |
| 2011/0216809 A1 | 9/2011 | Gan et al. |
| 2011/0256880 A1 | 10/2011 | Golaup et al. |
| 2011/0270984 A1 | 11/2011 | Park |
| 2011/0292884 A1* | 12/2011 | Li ........................ H04W 72/085 370/329 |
| 2011/0299446 A1 | 12/2011 | Chun et al. |
| 2011/0299479 A1* | 12/2011 | Deb .................... H04W 28/18 370/329 |
| 2011/0307612 A1 | 12/2011 | Junell et al. |
| 2011/0319129 A1 | 12/2011 | Bhat et al. |
| 2012/0002644 A1* | 1/2012 | Fettweis ............. H04W 72/048 370/336 |
| 2012/0014305 A1 | 1/2012 | Kakani et al. |
| 2012/0014471 A1 | 1/2012 | Subramanian et al. |
| 2012/0015607 A1 | 1/2012 | Koskela et al. |
| 2012/0163160 A1 | 6/2012 | Himayat et al. |
| 2012/0190379 A1 | 7/2012 | Hassan et al. |
| 2012/0257504 A1 | 10/2012 | Ballot et al. |
| 2012/0294146 A1 | 11/2012 | Wu |
| 2012/0295575 A1 | 11/2012 | Nam |
| 2012/0307744 A1 | 12/2012 | Charbit et al. |
| 2012/0313760 A1 | 12/2012 | Okano |
| 2013/0003656 A1 | 1/2013 | Cho et al. |
| 2013/0005357 A1 | 1/2013 | Takahashi et al. |
| 2013/0016635 A1* | 1/2013 | Linsky .............. H04W 72/1215 370/280 |
| 2013/0021963 A1 | 1/2013 | Maruta |
| 2013/0035064 A1 | 2/2013 | Balachandran et al. |
| 2013/0042011 A1 | 2/2013 | Sugizaki et al. |
| 2013/0051360 A1 | 2/2013 | Monte et al. |
| 2013/0072232 A1 | 3/2013 | Lee et al. |
| 2013/0102313 A1 | 4/2013 | Tinnakomsrisuphap et al. |
| 2013/0130658 A1* | 5/2013 | Tsampalis ............ H04W 4/18 455/414.1 |
| 2013/0155994 A1 | 6/2013 | Yoshizawa et al. |
| 2014/0253326 A1 | 9/2014 | Cho et al. |
| 2014/0334427 A1 | 11/2014 | Sun |
| 2014/0348185 A1* | 11/2014 | Ling et al. .................... 370/503 |
| 2014/0378147 A1 | 12/2014 | Hassan et al. |
| 2015/0289286 A1* | 10/2015 | Su ..................... H04W 72/1215 370/330 |

FOREIGN PATENT DOCUMENTS

| | | |
|---|---|---|
| EP | 1220557 A1 | 7/2002 |
| EP | 1137299 A3 | 2/2003 |
| EP | 1401226 A1 | 3/2004 |
| EP | 1458209 A2 | 9/2004 |
| EP | 1460791 A2 | 9/2004 |
| EP | 1513364 A2 | 3/2005 |
| EP | 1611706 A2 | 1/2006 |
| EP | 1332592 B1 | 2/2006 |
| EP | 1628498 A2 | 2/2006 |
| EP | 1717962 A1 | 11/2006 |

(56) References Cited

FOREIGN PATENT DOCUMENTS

| | | |
|---|---|---|
| EP | 1841115 A2 | 10/2007 |
| EP | 1850611 A1 | 10/2007 |
| EP | 2091287 A2 | 8/2009 |
| EP | 2136591 A2 | 12/2009 |
| EP | 2190126 A1 | 5/2010 |
| EP | 2274834 A2 | 1/2011 |
| EP | 2365725 A2 | 9/2011 |
| EP | 2373107 A1 | 10/2011 |
| EP | 2398151 A1 | 12/2011 |
| EP | 2498558 A1 | 9/2012 |
| EP | 2313980 B1 | 10/2018 |
| GB | 2320868 A | 7/1998 |
| GB | 2349043 A | 10/2000 |
| GB | 2428348 A | 1/2007 |
| GB | 2453622 A | 4/2009 |
| GB | 2474935 A | 10/2009 |
| GB | 2480002 A | 11/2011 |
| JP | 2006209457 A | 8/2006 |
| JP | 2006343984 A | 12/2006 |
| JP | 2008085718 A | 4/2008 |
| JP | 2010034625 A | 2/2010 |
| JP | 2010041269 A | 2/2010 |
| JP | 2010124229 A | 6/2010 |
| JP | 2011103520 A | 5/2011 |
| JP | 2012085011 A | 4/2012 |
| JP | 2013507809 A | 3/2013 |
| JP | 2013527695 A | 6/2013 |
| JP | 2013528985 A | 7/2013 |
| WO | 9631076 A1 | 10/1996 |
| WO | 9820689 A1 | 5/1998 |
| WO | 9835458 A1 | 8/1998 |
| WO | 9837674 A1 | 8/1998 |
| WO | 9907170 A2 | 2/1999 |
| WO | 9957697 A1 | 11/1999 |
| WO | 9957934 A1 | 11/1999 |
| WO | 9959373 A1 | 11/1999 |
| WO | 0057382 A2 | 9/2000 |
| WO | 0201892 A2 | 1/2002 |
| WO | 0239688 A1 | 5/2002 |
| WO | 03079717 A2 | 9/2003 |
| WO | 2005004500 A2 | 1/2005 |
| WO | 2005034378 A1 | 4/2005 |
| WO | 2006027672 A2 | 3/2006 |
| WO | 2006041708 A2 | 4/2006 |
| WO | 2006129166 A1 | 12/2006 |
| WO | 2007005030 A2 | 1/2007 |
| WO | 2007009043 A1 | 1/2007 |
| WO | 2007018697 A1 | 2/2007 |
| WO | 2007056467 A1 | 5/2007 |
| WO | 2007066399 A1 | 6/2007 |
| WO | 2007072814 A1 | 6/2007 |
| WO | 2007137046 A2 | 11/2007 |
| WO | 2008056023 A1 | 5/2008 |
| WO | 2008060119 A1 | 5/2008 |
| WO | 2008144323 A1 | 11/2008 |
| WO | 2009029440 A1 | 3/2009 |
| WO | 2009057886 A1 | 5/2009 |
| WO | 2009074717 A1 | 6/2009 |
| WO | 2009086050 A1 | 7/2009 |
| WO | 2009127690 A1 | 10/2009 |
| WO | 2009136724 A2 | 11/2009 |
| WO | 2009141001 A1 | 11/2009 |
| WO | 2010002219 A2 | 1/2010 |
| WO | 2010008845 A2 | 1/2010 |
| WO | 2010018690 A1 | 2/2010 |
| WO | 2010035159 A1 | 4/2010 |
| WO | 2010037230 A1 | 4/2010 |
| WO | 2010057127 A1 | 5/2010 |
| WO | 2010093647 A2 | 8/2010 |
| WO | 2010095876 A2 | 8/2010 |
| WO | 2010111006 A1 | 9/2010 |
| WO | 2010111150 A2 | 9/2010 |
| WO | 2010111428 A2 | 9/2010 |
| WO | 2010117965 A1 | 10/2010 |
| WO | 2010142021 A1 | 12/2010 |
| WO | 2011006768 A1 | 1/2011 |
| WO | 2011023206 A1 | 3/2011 |
| WO | 2011042370 A1 | 4/2011 |
| WO | 2011047694 A1 | 4/2011 |
| WO | 2011063813 A1 | 6/2011 |
| WO | 2011085026 A2 | 7/2011 |
| WO | 2011096746 A2 | 8/2011 |
| WO | 2011127447 A1 | 10/2011 |
| WO | 2011129098 A1 | 10/2011 |
| WO | 2011135764 A1 | 11/2011 |
| WO | 2011143234 A1 | 11/2011 |
| WO | 2011163287 A2 | 12/2011 |
| WO | 2012003566 A1 | 1/2012 |
| WO | 2012024346 A1 | 2/2012 |

OTHER PUBLICATIONS

Na Yi et al., "Underlay Cognitive Radio with Full or Partial Channel Quality Information", International Journal of Navigation and Observation, vol. 2010, Article ID 105723.*

Miao Shi et al., "Blind OFDM Systems Parameters Estimation for Software Defined Radio", 2nd IEEE international symposium on new Frontiers in Dynamic Spectrum Access Networks, Apr. 17-20, 2007, pp. 119-122.*

M. Martsola et al. "Machine to Machine Communication in Cellular Networks", 2nd International Conference on Mobile Technology, Applications, and Systems, Nov. 15-17, 2005.*

Krikidis et al., "Protocol Design and Throughput Analysis for Multi-User Cognitive Cooperative Systems", IEEE Transactions on Wireless Communications, IEEE Service Center, Piscataway, NJ, U.S., vol. 8., No. 9, Sep. 1, 2009, pp. 4740-4751, XP011278285, ISSN: 1536-1276.

Shi et al., "Blind OFDM Systems Parameters Estimation for Software Defined Radio", 2007 2nd IEEE International Symposium on New Frontiers in Dynamic Spectrum Access Networks: [DYSPAN 2007;] Dublin, Ireland, Apr. 17-20, 2007, IEEE, U.S., Apr. 1, 2007, pp. 119-122, XP031095610, ISBN: 978-1-4244-0663-0.

Nieminen et al., "Primary User Detection in Distributed Cognitive Radio Networks Under Timing Inaccuracy", New Frontiers in Dynamic Spectrum, 2010 IEEE Symposium on IEEE, Piscataway, NJ, USA, Apr. 6, 2010, pp. 1-8, XP031664859, ISBN: 978-1-4244-5189-0.

"Electromagnetic compatibility and Radio spectrum Matters (ERM); Operation methods and principles for spectrum access systems for PMSE technologies and the guarantee of a high sound production quality on selected frequencies utilising cognitive interference mitigation techniques," ETSI TR 102 799 V1.1.1, Jun. 2010, 55 pages.

"3rdGeneration Partnership Project; Technical Specification Group Services and System Aspects; System Improvements for Machine-Type Communications; (Release 11)," 3GPP TR 23.888 V1.2.0, Apr. 2011, 111 pages.

"3rd Generation Partnership Project; Technical Specification Group Services and System Aspects; Service requirements for Machine-Type Communications (MTC); Stage 1 (Release 10)," 3GPP TS 22368 V10.0.0, Mar. 2010, 25 pages.

Bartoli, A. et al., "Low-Power Low-Rate Goes Long-Range: The Case for Secure and Cooperative Machine-to-Machine Communications," May 3, 2011,Networking 2011 Workshops, Springer Berlin, Heidelberg, Berlin, KP019163032, May 3, 2011, 12 pages.

Cohen, R. et al., "A Scalable Scheme for Preventing Feedback Implosion in a Large-Scale Multi-Tier Sensor Network," IEEE Communications Society, IEEE Secon 2010 proceedings, 2010, 9 pages.

"Comments on IEEE 802," 18-04-0056-00-0000f_Comments_to_ TV_ Band_NPRM; IEEE-SA,XP017644508, Piscataway,NJ USA,Volume 802 .18, Dec. 1, 2004, 20 pages.

Fadlullah, Z. et al., "Toward Intelligent Machine-to-Machine Communications in Smart Grid," Recent Progress in Machine-to-Machine Communications, IEEE Communications Magazine, Apr. 2011, 6 pages.

Hu, W. et al., "Dynamic Frequency Hopping Communities for Efficient IEEE 802.22 Operation," Cognitive Radios for Dynamic Spectrum Access, IEEE Communications Magazine, May 2007, 8 pages.

(56) References Cited

OTHER PUBLICATIONS

"On RAN enhancements for MTC in Rel-11," Agenda item: 4.3.1, Source: ZTE, Document for: Discussion, 3GPP TSG-RAN WG2 meeting #74, R2-112862, Barcelona, Spain, May 9-13, 2011, 7 pages.
Sum, C.S. et al., "Coexistence of Homogeneous and Heterogeneous Systems for IEEE 802.15.4g Smart Utility Networks," 2011 IEEE International Symposium on Dynamic Spectrum Access Networks (DySPAN), 2011, 11 pages.
"TR 23.888 v1.2.0," Source: SIMTC Rapporteur (Intel), Document for: Approval, Agenda Item: 9.4, Work Item / Release: SIMTC / Rel-11, 3GPP TSG SA WG2 Meeting #85, TD S2-112516, May 16-20, 2011, Xi'an, China, 1 page.
"TG4g Coexistence Assurance Document," IEEE P802.15 Working Group for Wireless Personal Area Networks (WPANs), IEEE P802.15 Wireless Personal Area Networks, Sep. 2010, 32 pages.
WAVECOM Online Help 8.0, "Transmission Modes: PACTOR-II", downloaded at http:www.wavecom.chonlinehelpWCODE#!worddocumentspactorii.htrn, accessed, Mar. 14, 2012, 8 pages.
Webb, W., "Weightless: The Technology to Finally Realise the M2M Vision," XP55030536, etrieved from Internet: http://www.weightless.org/documents/download/ee575c15ed123be7c9e119d52bc48d1d4173162892123.retrieved on Jun. 20, 2012, Mar. 28, 2012, 8 pages.
Webb, W., "Weightless Technology An Overview," XP55030536, Mar. 28, 2012, 18 pages.
Wu, S. et al., "A Comparison of Multicast Feedback Control Mechanisms," Proceedings of the 38th Annual Simulation Symposium (ANSS'05), IEEE Computer Society, 2005, 8 pages.
Xiong, G. et al., "Smart (In-home) Power Scheduling for Demand Response on the Smart Grid," 2011 IEEE, Apr. 29, 2011, 7 pages.
"Machine-to-Machine communications (M2M); Functional architecture",ETSI Draft;00002V0112,European Telecommunications Standards Institute (ETSI),no. V0.11.2, May 10, 2011, XP014062936, 30 pages.

\* cited by examiner

DEVICE AND METHOD FOR DERIVING ALIGNMENT INFORMATION

The present invention relates to a communication device that needs to adjust its timing to be in reasonable alignment with another communication device in the network.

This application incorporates by reference UK Patent Application No. 1109867.0 ("Signal acquisition from cold start"), which was filed by the applicant hereof on 13 Jun. 2011.

A communication network may comprise a base station and one or more terminals with which the base station is required to communicate. The base station suitably shares the available communication resource between the terminals (which may number several thousand if the geographical area covered by the base station is large). It is well-known that the available communication resource may be allocated on a time-division and/or a frequency division basis. Dividing the communication resource on a time-division basis typically involves every communication between the base station and the terminals being allocated a time slot. The start and end time of each time slot is known to both parties to the communication. However, for this to be practicable, the base station and the terminals need to have sufficiently aligned clocks.

The base station clock is likely to be accurate since the base station will typically have access to a standard clock or to an absolute time via its connection with the core network or via another means, such as an internal GPS receiver. The base station is therefore likely to have ready access to an accurate time reference that it can use to synchronise its clock. The base station is also likely to have a quality internal clock that is not subject to significant clock drift. Conversely, many terminals will be simple, cheap devices that are unlikely to include expensive, high quality clocks. This is unlikely to be problematic provided that the terminals have a means for synchronising their clock with an accurate time reference at regular intervals, so as to prevent their clock from drifting ever further away from the base station's clock.

Dividing the communication resource on a frequency division basis involves dividing the available bandwidth into different frequency channels. Each channel may be associated with a particular carrier frequency. In order to receive a communication from a base station, the terminal not only needs to know what carrier frequency that communication is to be transmitted on but also has to align itself with that frequency, e.g. by means of a tuning circuit. As mentioned above, many of the terminals will be simple, cheap devices. Often their tuning circuits may not be entirely accurate or may suffer from frequency drift.

Therefore, there is a need for a means by which a simple communication terminal can align itself with communications in a network.

According to a first embodiment of the invention, there is provided a communication device configured to operate in accordance with a first communication protocol and to align itself with one or more communications transmitted in accordance with that protocol by identifying a communication transmitted in accordance with a second communication protocol that is not intended for the communication device, deriving alignment information from the identified communication and configuring itself to receive a communication transmitted in accordance with the first communication protocol in dependence on the alignment information.

The communication device may be configured to derive a timing indication as the alignment information and align itself with a timing of the communication in accordance with the first communication protocol in dependence on that timing indication.

The communication device may be configured to derive a frequency indication as the alignment information and align itself with a frequency of the communication in accordance with the first communication protocol in dependence on that frequency indication.

The communication device may not be configured to operate according to the second communication protocol.

The communication device may be configured to identify the communication transmitted in accordance with the second communication protocol from a part of the frequency spectrum in which it is configured to communicate in accordance with the first communication protocol.

The communication device may be configured to operate in whitespace according to the first communication protocol.

The communication device may be configured to derive the alignment information from a signal transmitted in whitespace.

The communication device may be configured to derive the alignment information from the identified communication without decoding that communication, The communication device may be configured to derive the alignment information from a repetitive element comprised in the identified communication.

The communication device may be configured to derive the alignment information from a cyclic prefix comprised in the identified communication.

The communication device may be configured to update its clock in dependence on the timing indication.

The communication device may be configured to determine a timing of a scheduled communication in dependence on the timing indication.

The communication device may be configured to perform a synchronisation operation in dependence on the alignment information.

The communication device may be configured to synchronise with a communication transmitted by a base station in accordance with the first communication protocol.

The communication device may be configured to operate in a machine-to-machine network.

According to a second embodiment of the invention, there is provided a method for aligning a communication device configured to operate according to a first communication protocol with one or more communications transmitted in accordance with that protocol, the method comprising identifying a communication transmitted in accordance with a second communication protocol that is not intended for the communication device, deriving alignment information from the identified communication and configuring the communication device to receive a communication transmitted in accordance with the first communication protocol in dependence on the alignment information.

Figure 2:
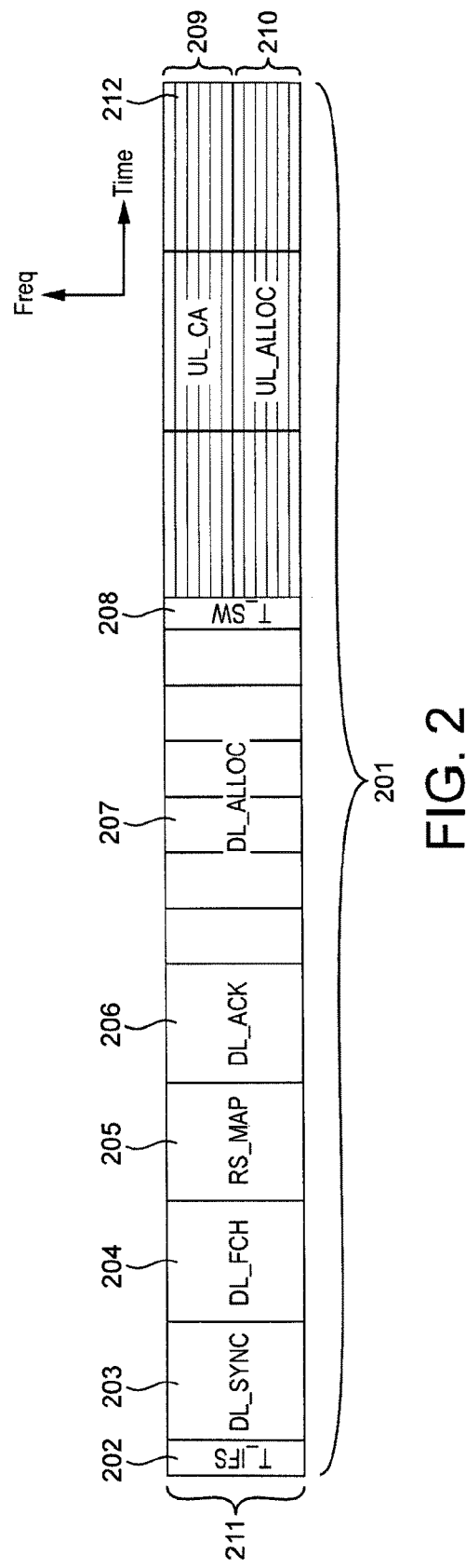
Figure 3:
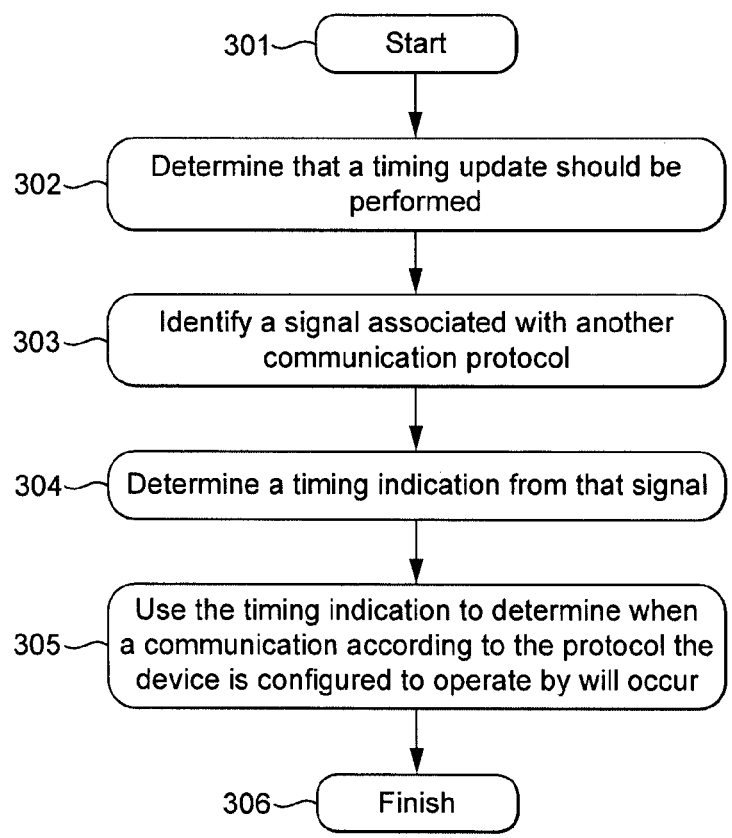
Figure 4:
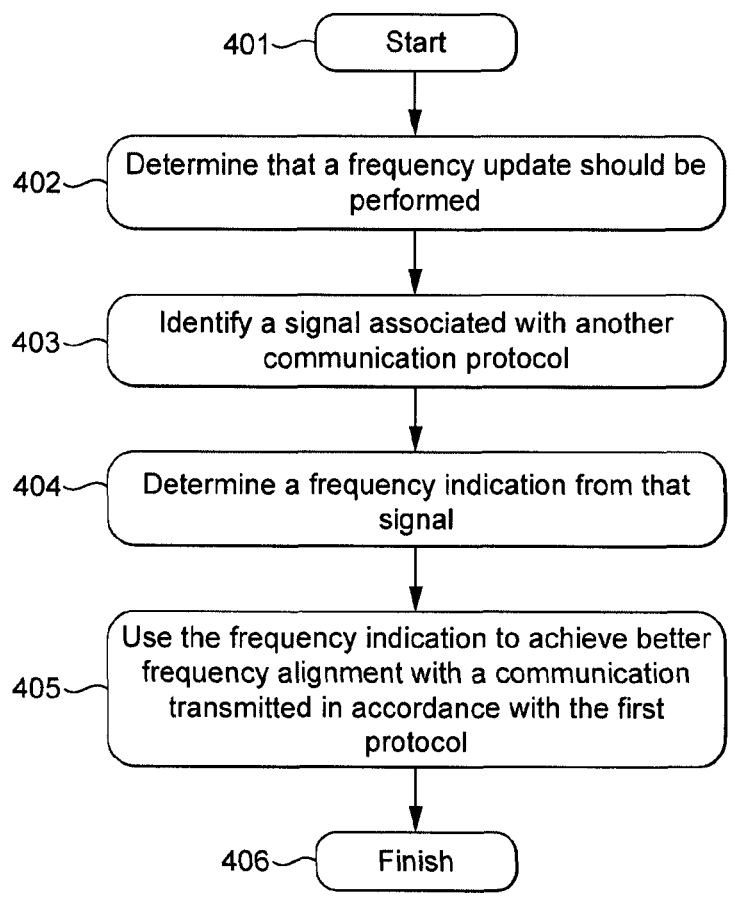
Figure 5:
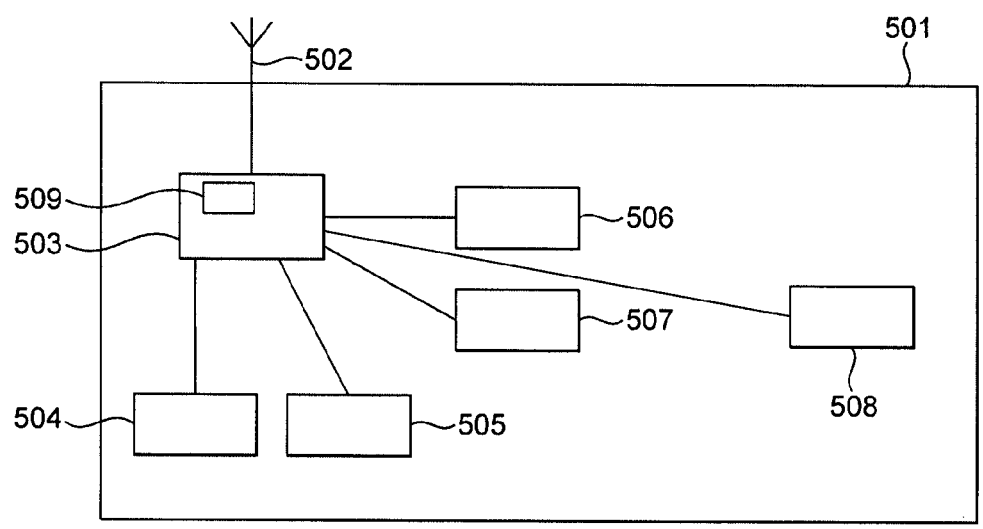

Aspects of the present invention will now be described by way of example with reference to the accompanying drawings. In the drawings:

FIG. 1 shows an example of a communication network;
FIG. 2 shows an example of a communication frame;
FIG. 3 shows an example of a process for improving time alignment;
FIG. 4 shows an example of a process for improving frequency alignment; and
FIG. 5 shows an example of a communication device.

A communication device may be configured to operate according to a first communication protocol. The device may use communications in accordance with another protocol to help align itself with communications transmitted in accordance with the first protocol. The device may achieve this by deriving alignment information from a communication sent using another protocol. It can use this information to configure itself for receiving communications under the first protocol.

The communication that the terminal uses to derive its alignment information will generally have originated from a network that the terminal is not part of. In other words, the communication will not be one that is intended for the terminal. It is simply a signal that the terminal is using for the limited purpose of deriving alignment information (e.g. timing and/or frequency information). Usually the terminal will not be configured to operate in accordance with the protocol under which the alignment signal was sent. This is not problematic since the terminal does not need to decode the signal.

The first communication protocol may divide the available frequency spectrum on a time-division basis so that the communication device needs to have a clock that is sufficiently close to the clocks of other devices in the network if it is to be able to correctly judge the timings of communications in the network. The communication device may address this requirement by determining a timing indication from a signal transmitted according to a second communication protocol. The communication device may then use that timing indication to determine the timing of a communication according to the first communication protocol. This may straightforwardly be achieved by the communication device using the timing indication to determine an offset between its own clock and that of a reference time, and adjusting its own clock (and thus the time when it expects to receive/transmit data to the base station) accordingly.

The first communication protocol may also (or alternatively) divide the available frequency spectrum on a frequency-division basis. The first communication protocol might also implement frequency hopping. The communication device suitably includes a tuning circuit to enable it to listen to a particular frequency channel. The tuning circuit may include one or more signal generators for generating signals having frequencies that match the frequency of the signal the device wants to listen to. It is helpful for the communication device to be able to calibrate its tuning circuit so that the closest possible frequency match can be achieved. If the communication device can frequency-align itself with a strong signal transmitted in accordance with the second protocol it may synchronise more easily with a weak first-protocol signal. This is because if its frequency reference is closer to the first-protocol signal it will see stronger correlation peaks when receiving that signal, making further network acquisition simpler.

There is a relationship between a timing indication and a frequency indication so it may be possible to convert between from one to the other. However, the relationship is not a straightforward one so in practice it will often be easier to derive the required timing and/or frequency indication directly from the communication according to the second protocol.

A wireless network may be configured to operate without having been specifically allocated any part of the electromagnetic spectrum. Such a network may be permitted to operate in so-called whitespace: a part of the spectrum that is made available for unlicensed or opportunistic access. Typically whitespace is found in the UHF TV band and spans 450 MHz to 800 MHz, depending on the country. A large amount of spectrum has been made available for unlicensed wireless systems in this frequency range.

A problem with operating in whitespace is that the available bandwidth is variable and cannot be guaranteed. These limitations are well-matched to the capabilities of machine-to-machine networks in which there is no human interaction. Machine-to-machine networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of whitespace that can be used by unlicensed systems). The FCC has mandated that systems operating in whitespace must reference a database that determines which channels may be used in any given location. This is intended to avoid interference with the TV transmissions and certain other incumbent systems such as wireless microphones. The network will also have to coexist with spurious interference from devices such as electric drills. In order to minimise the impact of the machine-to-machine network on television broadcasts and the negative impact of external interferers on the machine-to-machine network, the network preferably implements a frequency hopping sequence generated in dependence on information in the whitespace database and designed to avoid frequencies found to suffer interference and/or poor propagation or throughput and frequencies on which the network will cause interference to other users.

One or more embodiments of the invention will now be described with specific reference to a wireless network shown in FIG. 1. One or more embodiments of the invention will also be described with specific reference to a wireless network in which the communication device is a terminal. This is for the purposes of example only and it should be understood that the mechanisms described herein may be implemented in any suitable communication network and by any suitable communication device, irrespective of its role in the network.

The network in FIG. 1, which is shown generally at 104, comprises one or more base stations 105 that are each capable of communicating wirelessly with a number of terminals 106. Each base station may be arranged to communicate with terminals that are located within a particular geographical area or cell. The base stations transmit to and receive radio signals from the terminals. The terminals are entities embedded in machines or similar that communicate with the base stations. Suitably the wireless network is arranged to operate in a master-slave mode where the base station is the master and the terminals are the slaves. Each base station may be arranged to communicate with a large number of terminals, e.g. a thousand or more.

The base station controller 107 is a device that provides a single point of communication to the base stations and then distributes the information received to other network elements as required. The network may be arranged to communicate with a client-facing portion 101 via the Internet 102. In this way a client may provide services to the terminals via the wireless network.

Other logical network elements shown in this example are:

- Core network. This routes traffic information between base stations and client networks.
- Billing system. This records utilisation levels and generates appropriate billing data.
- Authentication system. This holds terminal and base station authentication information.
- Location register. This retains the last known location of the terminals.

Broadcast register. This retains information on group membership and can be used to store and process acknowledgements to broadcast messages, Operations and maintenance centre (OMC). This monitors the function of the network and raises alarms when errors are detected. It also manages frequency and code planning, load balancing and other operational aspects of the network.

White spaces database. This provides information on the available white space spectrum.

Client information portal. This allows clients to determine data such as the status of associated terminals, levels of traffic, etc.

In practice, many of the logical network elements may be implemented as databases running software and can be provided on a wide range of platforms. A number of network elements may be physically located within the same platform.

A network such as that shown in FIG. 1 may be used for machine-to-machine communications, i.e. communications that do not involve human interaction. Machine-to-machine communications are well-matched to the limitations of operating in white space, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are well-adapted to tolerating the delays and breaks in communication that can result from these varying communication conditions. The network should also be adapted to the communication conditions. For example, the network may make use of frequency hopping sequences (which are suitably different for neighbouring cells), different data rates (which can be adapted to the signal conditions and technical capabilities of particular terminals), spreading codes (which can also be adapted to the signal conditions and technical capabilities of the terminals) and acknowledgement mechanisms (so that lost packets can be identified and resent).

The base station may use a frame structure to organise communications with the plurality of terminals in its cell. Medium access control (MAC) may be used to share the available radio resource between the plurality of terminals. An example of a suitable frame is shown in FIG. 2. The frame (shown generally at 201) comprises time to ramp-up to full output power 202 (T_IFS), a synchronisation burst 203 (DL_SYNC), an information field providing the subsequent channel structure 204 (DL_FCH), a map of which information is intended for which terminal and uplink timeslot allocations 205 (DL_MAP), a field to allow acknowledgement of previous uplink transmissions 206 (DL_ACK) and then the actual information to be sent to terminals 207 (DL_ALLOC). There is then a guard period for ramp-down of the downlink and ramp-up on the uplink 208 (T_SW), followed by channels set aside for uplink contended access 209 (UL_CA) in parallel with the allocated uplink data transmissions 210 (UL_ALLOC).

Each frame is suitably two seconds long. The base stations may be arranged to periodically transmit a broadcast frame that all terminals should listen to as far as possible. The base station may use this frame to transmit multicast control messages such as: forthcoming changes to the channel assignment/hopping sequences; uplink transmit power limits; supplementary data transfers; and changes to the broadcast frame interval. This frame may be transmitted around once every 15 minutes, and may be considered to form the first frame of a "super-frame". The frame may be known as the "broadcast channel". The frequency of this frame is a trade-off. If it is too frequent the terminals will consume excessive battery power listening to the broadcast frames. If it is too infrequent, it may take too long to "page" or "poll" terminals and the frequency with which network parameters can be changed decreases.

Every terminal in the network needs to have access to a clock. Typically each terminal will have its own clock. The terminal uses the clock to determine when each frame will start and end, when each time slot within a frame will start and end, and when the base station will hop onto a different frequency in the frequency hopping sequence. The terminal will also use its clock to determine when it should receive transmissions from the base station and when it should make transmissions to the base station. The terminal will use the clock to determine when it should wake from sleep mode if it powers down between scheduled transmissions. The terminal may further use its clock to help synchronise with a base station when it first joins the network or if it wants to switch from one base station to another. Various different mechanisms for efficient synchronisation are described in UK Patent Application No. 1109867.0, which is incorporated herein by reference.

An example of a process that a terminal may employ to determine how far off its clock is from an accurate time reference is shown in FIG. 3. The process starts in step 301. In step 302 the terminal determines that a timing update should be performed. The terminal may be configured to perform timing updates at predetermined time intervals, each time that it wakes up (e.g. on first waking), in response to a command from a base station or in response to a determination that the clock has drifted too far from the time reference (e.g. if the terminal misses the start of a frame or a scheduled communication because it wakes-up too late, or if it wakes too early such that it is awake for longer than a predetermined time before it starts to receive a frame). This list of examples is not intended to be exhaustive and the terminal might determine that a timing update is to be performed in dependence on any other suitable indicator. The terminal then identifies a signal that has been transmitted using a different communication protocol from the first communication protocol (step 303). This signal is a signal belonging to a different network from that to which the terminal belongs. The terminal will usually not be capable of operating according to the second protocol. The terminal will therefore typically not decode the signal in the conventional sense of extracting the data encoded in that signal. However, the terminal does use the signal to determine a timing indication (step 304). The terminal then uses the timing indication to work out how far its own clock is from a standard time reference. The base station will usually be substantially aligned with a standard time reference (e.g. GPS absolute time, UTC, GMT etc). Therefore, the terminal can use the timing indication to work out how far its clock is likely to be from the clock of the base station. This suitably helps the terminal to determine when a communication in its own network will occur (step 305). The process terminates in step 306.

An example of a process that a terminal may employ to determine how far off its clock is from a frequency reference is shown in FIG. 4. The process starts in step 401. In step 402 the terminal determines that a frequency update should be performed. The terminal may be configured to perform frequency updates at predetermined time intervals, each time that it wakes up (e.g. on first waking), in response to a command from a base station or in response to a determination that the first protocol signal (e.g. a whitespace signal) is weak, in response to difficulties in synchronising with the base station and/or in response to difficulties in decoding information contained in first protocol communications. This list of examples is not intended to be exhaustive and the terminal might determine that a frequency update is to be performed in dependence on any other suitable indicator. The terminal then identifies a signal that has been transmitted using a different communication protocol from the first communication protocol (step 403). This signal is a signal belonging to a different network from that to which the terminal belongs. The terminal will usually not be capable of operating according to the second protocol. The terminal will therefore typically not decode the signal in the conventional sense of extracting the data encoded in that signal. However, the terminal may use the signal to determine a frequency indication (step 404). The terminal then uses the frequency indication to achieve better frequency alignment with communications in its own network (step 405). The process terminates in step 406.

Obtaining a frequency indication from a secondary signal allows a terminal to use a potentially strong secondary signal to achieve better frequency alignment with a weaker primary signal. As an example, this would allow a terminal configured to operate in a machine-to-machine network such as the network shown in FIG. 1 to derive frequency information from a TV signal that it can use to more easily synchronise with the detailed frequency and timing information on a potentially weak machine-to-machine signal. This is because the terminal will see stronger correlation peaks if its frequency reference is closer to the machine-to-machine synchronisation sequence, making further network acquisition simpler. Various different mechanisms for efficient synchronisation are described in UK Patent Application No. 1109867.0, which is incorporated herein by reference.

There are a number of options for the signal that the terminal uses to determine the alignment information. The terminal might use a standard time reference, such as the signals used by radio clocks. Specific examples of the signals a terminal might use include time references transmitted by radio stations (e.g. the pips transmitted by the BBC) or the absolute time reference obtainable from GPS signals. However, GPS signals tend to have poor penetrative power. For example, they cannot always be received in built-up areas or inside buildings. Also the terminal is preferably a simple device that is cheap to manufacture. It is therefore preferred for the terminal to use a signal that does not require it to have a separate receiver.

A preferred option is for the terminal to use analogue and/or digital television signals to obtain the alignment information. TV signals have good penetration and can be received inside buildings. TV signals also have the advantage of being comprised in the same part of the frequency spectrum as the machine-to-machine network (i.e. whitespace), thus minimising the frequency range required of the terminal's receiver. TV signals are transmitted at precise, predefined frequencies from which a terminal can derive a frequency indication. TV signals also include features that the terminal can use to deduce a timing indication without having to decode that signal. For example, depending on the region, TV signals may include repetitive components or cyclic prefixes from which the terminal can extract timing information without having to decode the signal. The terminal will typically not be capable of decoding the TV data comprised in the signal, but it may be capable of extracting timing and/or frequency information from the signal.

It will often not be possible for the terminal to decode the TV signal because its amplitude is too low. This is particularly the case if the terminal looks in the frequency channels used in its cell for an alignment signal. This is because the channels used for frequency hopping in a whitespace network are selected specifically to avoid the frequencies used by nearby TV transmitter stations. Therefore, if the terminal restricts its search to those frequency channels it is likely to encounter only low amplitude TV signals, transmitted by TV transmitter stations that are a considerable distance from the cell in which it is located.

The terminal, once it has obtained the timing indication, suitably uses that indication to determine a measure of how much its clock is in error, i.e. how far its clock is likely to be from the base station's clock, the network clock and/or the clocks of other terminals in the network. The terminal may use the timing indication to determine an error in its own clock, which it may store as an offset to be used in calculating wake-up times, start-times of frames, start-times of scheduled communications etc. The terminal might alternatively update its clock directly by resetting it in dependence on what the timing indication indicates is the clock error. The terminal might store timing indications determined at multiple time instances and use those to generate an indication of clock drift. The terminal might determine how often it should obtain a new timing indication in dependence on the determined clock drift. The terminal might also determine, once it has obtained an indication of clock drift, that timing indications can be obtained less frequently. Instead, the terminal may use the indication of clock drift and the time that has elapsed since the last timing update to determine how far its clock is likely to be from that of the base station.

The terminal suitably uses any frequency indication that it derives from the alignment signal to calibrate its tuning circuits; for example, by adjusting the signal generators. The terminal then uses the calibrated tuning circuits for listening to a particular frequency channel.

The mechanisms described herein may be advantageously implemented by a terminal when it tries to attach to a new base station, in order to speed up synchronisation. The terminal may be able to achieve synchronisation more quickly (saving both time and power) if it has a better idea of what the base station's frequency and timings are likely to be. The terminal may also be able to save power by not waking up too early before scheduled communications with the base station (either because of an error in its clock or because the terminal was in the habit of waking up too early to make allowances for errors in its clock and avoid missing communications). Keeping the terminal in better alignment with the base station may also help to ensure that the terminal does not miss scheduled communications with the base station or communicate on the wrong frequency in a frequency hopping sequence. Calibrating its tuning circuits using a frequency reference may enable the terminal to achieve a better lock on the base station's communications.

An example of the functional blocks that may be comprised in a communication device according to one embodiment of the invention are shown in FIG. 5. The communication device, shown generally at 501, comprises a communication unit 503 connected to an antenna 502 for transmitting and receiving messages to and from a base station. The communication unit comprises a tuner 509. The communication unit may also be capable of receiving messages and/or signals transmitted in accordance with a protocol with which it is not configured to operate.

The communication device further comprises an alignment unit 506 configured to derive alignment information from a suitable alignment signal. The communication device comprises a clock 504 and an offset unit 505 for determining an error in the clock in dependence on a timing indication. Timing indications may be fed back from the alignment unit to the offset unit and the clock. The timing indications may also be fed back to the communication unit for scheduling communications, scheduling wake-up times, assisting with synchronisation etc. The terminal may also comprise a monitoring unit 507 for tracking changes in the clock offset to determine an indication of clock drift. Frequency indications may be fed back from the alignment unit to the communication unit and particularly the tuner. The communication device comprises a correlator 508 for synchronising with communications from the base station. The communication unit may effectively act as a central controller and may pass information between the other functional blocks.

The apparatus in FIG. 5 is shown illustratively as comprising a number of interconnected functional blocks. This is for illustrative purposes and is not intended to define a strict division between different parts of hardware on a chip. In practice, the communication device preferably uses a microprocessor acting under software control for implementing the methods described herein. In some embodiments, the algorithms may be performed wholly or partly in hardware.

An example of the protocol according to which the communication device is configured to operate is a machine-to-machine protocol such as Weightless. The protocol according to which the timing indications are transmitted might be a television protocol such as an ATSC or NTSC protocol, or an ISDB-T or DVB-T protocol. These are examples only, and it should understand that any suitable communication protocols might be used.

The mechanisms described herein might be most beneficially implemented by a communication device that is a terminal. However, the communication device might perform any role in the network. For example, the communication device might be a base station.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication device, comprising:
    a processor; and
    a computer-readable storage medium storing a program to be executed by the processor, the program including instructions for decoding and extracting data from messages transmitted in accordance with a first communication protocol and aligning the communication device with one or more communications transmitted in accordance with the first communication protocol by:
        identifying a first communication, wherein the first communication is transmitted as a first wireless signal in accordance with a second communication protocol that is not intended for the communication device and at an amplitude at which it would not be possible for the communication device to decode data in the wireless signal, and wherein the communication device is not configured to decode messages transmitted in accordance with the second communication protocol;
        deriving alignment information from the identified first communication, wherein the alignment information includes one or more of timing information and frequency information; and
        configuring itself to receive a second communication transmitted as a second wireless signal in accordance with the first communication protocol in dependence on the alignment information, wherein the first wireless signal is a signal transmitted on a licensed band, and wherein the second wireless signal is a machine-to-machine communication signal in a whitespace between licensed bands used in a location of the communications device.

2. The communication device as claimed in claim 1, wherein the program further includes instructions for:
    deriving a timing indication from the timing information; and
    aligning itself with a timing of the second communication in accordance with the first communication protocol in dependence on the timing indication.

3. The communication device as claimed in claim 1, wherein the program further includes instructions for:
    deriving a frequency indication from the frequency information; and
    aligning itself with a frequency of the second communication in accordance with the first communication protocol in dependence on the frequency indication.

4. The communication device as claimed in claim 1, wherein the program further includes instructions for identifying the first communication transmitted in accordance with the second communication protocol from a part of a frequency spectrum in which it is configured to communicate in accordance with the first communication protocol.

5. The communication device as claimed in claim 1, wherein the program further includes instructions for operating in whitespace according to the first communication protocol.

6. The communication device as claimed in claim 1, wherein the program further includes instructions for deriving the alignment information from a signal transmitted in whitespace.

7. The communication device as claimed in claim 1, wherein the program further includes instructions for deriving the alignment information from the identified first communication without decoding the identified communication.

8. The communication device as claimed in claim 1, wherein the program further includes instructions for deriving the alignment information from a repetitive element comprised in the identified first communication.

9. The communication device as claimed in claim 1, wherein the program further includes instructions for deriving the alignment information from a cyclic prefix comprised in the identified first communication.

10. The communication device as claimed in claim 2, wherein the program further includes instructions for updating a clock in dependence on the timing indication.

11. The communication device as claimed in claim 2, wherein the program further includes instructions for determining a timing of a scheduled communication in dependence on the timing indication.

12. The communication device as claimed in claim 1, wherein the program further includes instructions for performing a synchronization operation in dependence on the alignment information.

13. The communication device as claimed in claim 12, wherein the program further includes instructions for synchronizing with a communication transmitted by a base station in accordance with the first communication protocol.

14. The communication device as claimed in claim 1, wherein the communication device is further configured to operate in a machine-to-machine network.

15. A method for aligning a communication device configured to decode and extract data from messages transmitted in accordance with a first communication protocol, the method comprising:

identifying a first communication, the first communication being transmitted as a first wireless signal in accordance with a second communication protocol that is not intended for the communication device and at an amplitude at which it would not be possible for the communication device to decode data in the wireless signal, wherein the communication device is not configured to decode messages transmitted in accordance with the second communication protocol;

deriving alignment information from the identified first communication, wherein the alignment information includes one or more of timing information and frequency information; and configuring the communication device to receive a second communication transmitted as a second wireless signal in accordance with the first communication protocol in dependence on the alignment information, wherein the first wireless signal is a signal transmitted on a licensed band, and wherein the second wireless signal is a machine-to-machine communication signal in a whitespace between licensed bands used in a location of the communications device.

16. The communication device as claimed in claim 1, wherein the licensed band is a band for a television signal.

17. The communication device as claimed in claim 16, wherein a frequency of the second wireless signal is selected according to information in a whitespace database and according to the location of the communications device.

18. The method as claimed in claim 15, wherein the licensed band is a band for a television signal.

19. The method as claimed in claim 18, wherein a frequency of the second wireless signal is selected according to information in a whitespace database and according to the location of the communications device.

* * * * *